United States Patent Office 2,879,889
Patented Mar. 31, 1959

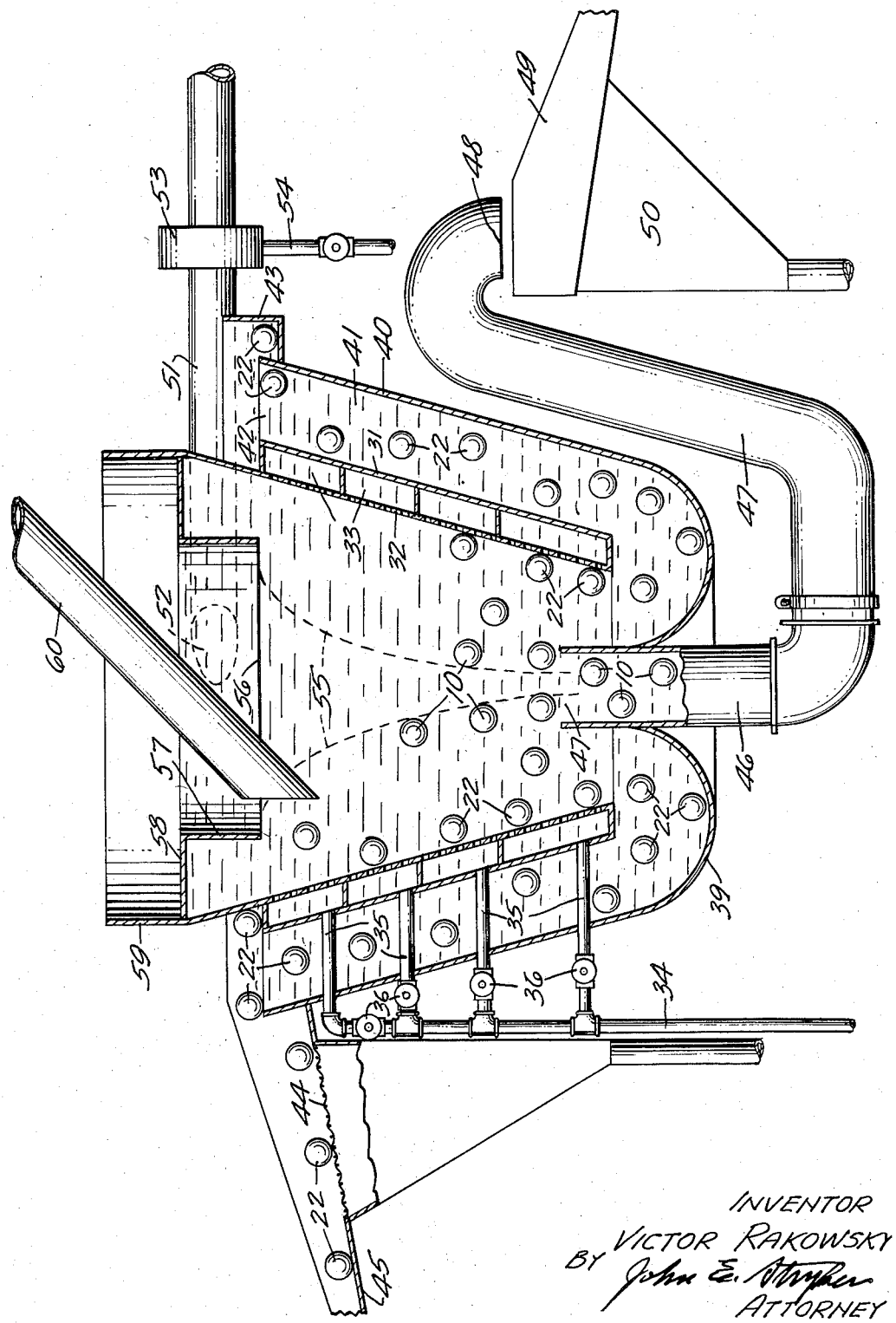

2,879,889

APPARATUS FOR SEPARATING MIXED PRODUCTS HAVING SPECIFIC GRAVITIES LESS THAN ONE

Victor Rakowsky, Joplin, Mo.

Application June 3, 1954, Serial No. 434,140

4 Claims. (Cl. 209—173)

This invention relates to the separation of solid products of different specific gravities less than one into fractions of different average specific gravities respectively higher and lower than a selected specific gravity less than one and contemplates improvements in both the process and apparatus for making such separations.

It is an object of my invention to provide economical and highly efficient methods and apparatus for effecting such separations in a medium of dynamic whirlpool type comprising water or an aqueous solution which is so charged with gas that the effective specific gravity of the separatory medium is less than one.

A particular object is to provide improved apparatus for effecting such separations comprising a vessel horizontally defining a confined space containing a liquid and having bottom enclosing means formed with a multiplicity of openings, in combination with means for forcing a gas, e.g., air, into the vessel and liquid through the bottom openings in proportions which are effective to produce a separatory medium in the vessel having specific gravity less than one and between the specific gravities of the products to be separated.

Another object is to provide separatory procedure of the class described which includes the steps of producing in a confined space a rotary flow of separatory medium comprising a liquid charged with a gas in controlled proportions whereby the density of the medium in a central zone of the confined space is lower than the density of the medium in an annular zone surrounding the central zone, introducing into such medium the mixture of products to be separated, discharging the lighter fractions of the product from such central zone and discharging the heavier fractions of the product from an annular zone surrounding the central zone.

The invention also includes certain other novel procedural and structural features which will be more fully pointed out in the following specification and claims.

Heretofore "sink and float" methods for separating mixtures of solid particles of different specific gravity into fractions according to specific gravity have been developed and used extensively in a number of industries but progress has been made largely in separations dealing with mixtures wherein the preponderance of the constituents have specific gravities above one. Both static and dynamic fluid separatory mediums have been used with heavy media containing finely divided solids. However, such media are not suited to the separation of products such as the food products which float in water. Attempts have been made to use low gravity liquids, e.g., grain alcohol or certain oils as separatory media in this field, but such liquids are not commercially satisfactory for this purpose because they are either too expensive or they contaminate or are otherwise injurious to the product.

The present invention is designed to meet the need for a low gravity medium of low cost and general suitability for grading food products, e.g., fruits, vegetables or nuts which normally float in water. Sound, good quality citrus fruit, for example, may be separated from pulpy, frost-damaged or immature fruit by gravity separation in a medium comprising gas-charged water having a specific gravity of about .87–.90. In such a medium the low grade fruit will float and the high grade fruit will sink.

My invention will be best understood by reference to the accompanying drawing which illustrates, schematically, by way of example and not for the purpose of limitation, apparatus employing the principles of my invention.

The single figure of the drawing is a part side elevational view and part vertical sectional view showing a preferred form of apparatus employing dynamic whirlpool action in the separatory medium.

In the apparatus shown separation takes place in a vessel having an outer wall 31 and an inner wall 32 between which air chambers 33 are formed. The inner wall 32 is foraminous, being formed with a multiplicity of minute perforations for the passage of air or other gas, suitably distributed over the wall area. The chambers 33 may be supplied with air under pressure from a conduit 34 having branches 35 extending to the several chambers 33 and the flow of air through each branch 35 is under control of a valve 36. An annular bottom closure member 39 of the separatory vessel extends beneath the walls 31 and 32 in continuation of a third annular wall 40 which is disposed to surround the wall 31 in spaced relation thereto. Thus, an annular conduit 41 is provided having an annular top opening 42 from which the heavier product may be discharged into a surrounding receptacle 43. This receptacle has an inclined bottom over which the product and overflow liquid may be carried by gravity to a screen 44 adapted to drain off the liquid and allow the heavier product to pass to a discharge chute 45.

A discharge conduit 46 communicates centrally with the lower portion of the separatory vessel and has an open upper end 47 into which the lighter product is discharged. Extending in continuation of the conduit 46 is a flexible conduit 47 having a discharge end 48, the elevation of which may be adjusted to regulate the rate of discharge through the conduit 46. From the discharge end 48 liquid carrying the lighter fraction of the product may be delivered to a chute 49 having a bottom screen (not shown) through which the liquid flows to a receptacle 50 and thence to a recirculating pump, or, if the liquid is to be wasted, to waste. The lighter product may be delivered by the chute 49 to a conveyor or receptacle for subsequent disposal.

Water or other liquid may be supplied through a conduit 51 which discharges through a port 52 communicating with the upper portion of the separatory vessel or through an opening in the wall of the vessel at a lower elevation. The port 52 or other inlet opening is preferably disposed substantially tangentially to the space defined by the vessel so that a spiral flow around and through the vessel is established. The water or other liquid entering through the conduit 51 and port 52 may be aerated by means of an aerating device 53 associated with the conduit 51. This device may be supplied with air under pressure through a conduit 54 which feeds an annular air chamber surrounding the conduit 51 and having a multiplicity of apertures disposed to inject air into the stream of liquid flowing through the conduit 51.

The pressure and rate of flow of gas-charged water entering through the port 52 may be so adjusted as to create a whirlpool having a central vortex indicated in broken lines at 55, which is open from an upper open end 56 of the separatory vessel to the bottom opening 47 into the conduit 46. The opening 56 is defined by an annular baffle 57 which projects downward into the vessel from an annular horizontal member 58 above which an annular wall member 59 rises to a height sufficient to prevent the swirling medium from over-flowing the separatory vessel. Extending into the open top of the separatory vessel is a conduit 60 through which the mixed products to be separated are fed.

In preparation for operation of the apparatus shown in the drawing, aerated water is supplied, under pressure, through the conduit 51 and the entering flow is adjusted to produce a suitable rate of discharge through the annular opening 42 and central opening 47 and also to create the required rotary flow in the separatory vessel. By adjustment of the elevation of the discharge opening 48 of the flexible conduit 47 the relative rates of overflow through the openings 42 and 47 may be regulated. The medium entering through the port 52 is thus caused to swirl spirally downward through the vessel to the bottom openings into the central conduit 46 and annular conduit 41. As a result of the rotary flow and centrifugal action in the vessel, there is a concentration of air bubbles in the central zone of the separatory body extending along its axis and a relatively lower concentration of air in the annular zone surrounding this central zone. Consequently the specific gravity of the medium in the central zone is substantially below that of the surrounding medium. Air under pressure may also be injected into the separatory medium through the openings in the foraminous wall 32 in order to maintain the predetermined specific gravity gradients in the vessel. One of these gradients is the horizontal one caused by the centrifugal action in the vessel as hereinbefore described and the other is a vertical one resulting from the introduction of the gas at various elevations through openings in the inclined foraminous wall 32 or through the port 52 with the liquid. There is thus a concentration of air bubbles near the upper surface of the fluid medium and progressively lower concentrations of gas at lower elevations in the vessel.

When such adjustments have been made, the mixed products to be separated are introduced into the separatory vessel through the conduit 60 at a suitable rate. Due to the rotary flow and relative specific gravities of the mixed products and medium, the heavier product 22 is caused to migrate to and to be carried downward in an annular zone adjacent to the wall member 32 and the lighter product 10 migrates to the central zone of lower specific gravity and is carried downward by the spiral current into the opening 47. Upon entering the opening, the lighter product 10 is carried through the conduits 46 and 47 to the receptacle 49. The heavier product 22, when it arrives at the bottom of the separatory vessel, is carried outward into the annular conduit 41 where the liquid has lost most of its charge of gas. Due to the relatively high specific gravity of the liquid in the conduit 41, the heavier product rises by gravity therein, assisted by the rising current, and is discharged by the overflow current into the receptacle 43. Finally this product is carried over the screen 44 into the discharge chute 45.

For the separation of some products it may be unnecessary to increase the rotary velocity in the separatory vessel to the point where an open vortex such as that indicated at 55 is formed. Even with rotary flow at lower velocities, it is possible to produce sufficient concentration of air bubbles in the central zone to cause the lighter product to sink in this zone while the heavier product sinks in the gas charged liquid in the surrounding zone.

Various methods may be employed for charging the liquid with gas for use in the separatory vessel. One such method involves the forcing of the gas into the liquid in the separatory vessel through a multiplicity of minute openings in the bottom and/or side walls of the vessel as hereinbefore described and illustrated. A second method involves the aeration of a stream of the liquid just before or during its introduction into the separatory vessel. This is exemplified by aerating means such as the device 53 which may be employed in connection with either a substantially static separatory body or with one in which dynamic currents of either high or low velocity are used to assist in the separation of the different fractions according to specific gravity.

A third method of charging a liquid with a gas to produce a fluid separatory medium having a specific gravity less than one may comprise, dissolving the gas in the liquid under pressure and then introducing the resulting fluid into the bottom of a separatory vessel where the pressure is released so that gas bubbles of minute size are distributed and rise throughout the body of medium. It will be evident that one or more of the herein described methods of charging the fluid medium with gas may be employed in combination in order to maintain a suitable specific gravity less than one in the separatory medium.

I claim:

1. Apparatus for separating a mixture of solid products of different specific gravities into fractions of different average specific gravity respectively higher and lower than a selected specific gravity less than one, which apparatus comprises: means horizontally defining a confined space having a bottom enclosing means; means for introducing a liquid charged with gas into said confined space; means for continuously charging the liquid in said space with sufficient gas to produce therein a separatory medium having a specific gravity less than one; means for causing said liquid and gas to flow spirally around and through said space to thereby maintain in a central zone of the medium extending along the axis of said space an effective specific gravity which is lower than the specific gravity of the separatory medium in a second zone more removed from the axis of said space; means for introducing the mixture of products of different specific gravity to be separated into said space; means for discharging the lower gravity fraction of said products centrally from the lower end of said space, and means for discharging the higher gravity fraction of said products from points radially removed from the axis of said space and near the lower end thereof.

2. Apparatus for separating a mixture of solid products of different specific gravities into fractions of different average specific gravity respectively higher and lower than a selected specific gravity less than one, which apparatus comprises: means horizontally defining a confined annular space having a bottom enclosing means; means for introducing a liquid under pressure substantially tangentially into said confined space; means for continuously charging the liquid in said space with sufficient gas to produce therein a separatory medium having specific gravity less than one; means for introducing the mixture of products of different specific gravity into said space; means for discharging the lower gravity fraction of said products centrally from the lower end of said space, and means for discharging the higher gravity fraction of said products from an annular zone radially removed from the axis of said space and near the lower end thereof.

3. Apparatus for separating a mixture of solid products of different specific gravities into fractions of different average specific gravity respectively higher and lower than a selected specific gravity less than one, which apparatus comprises; means horizontally defining a confined annular space having a bottom enclosing means; means for introducing a liquid under pressure substantially tangentially into said confined space, means for continuously charging the liquid in said space with sufficient gas to produce therein a separatory medium having specific gravity less than one, said means for continuously charging the liquid with gas being distributed vertically and horizontally to cause a concentration of gas near the upper surface of the separatory medium; means for introducing the mixture of products of different specific gravity to be separated into said space near the upper surface of the separatory medium; means for discharging the lower gravity fraction of said product centrally from the lower end of said space; and means for discharging the higher gravity fraction of said products from an annular zone more removed from the axis of said space near the lower end thereof.

4. Apparatus for separating a mixture of solid products of different specific gravities into fractions of different average specific gravity respectively higher and lower than a selected specific gravity less than one, which apparatus comprises; a vessel having an annular foraminous upwardly flaring wall and a bottom enclosing means; means for introducing a liquid under pressure substantially tangentially into said vessel, means for continuously forcing a gas under pressure through openings in said wall into the liquid in said vessel and in sufficient quantity to produce a separatory medium therein having specific gravity less than one, means for introducting the mixture of products of different specific gravity to be separated into said vessel near the upper surface of the separatory medium therein; means for discharging the lower gravity fraction of said product centrally from the lower portion of said vessel, and means for discharging the higher gravity fraction of said products from a zone radially removed from the axis of said vessel near the lower end thereof.

References Cited in the file of this patent
UNITED STATES PATENTS

| | | |
|---|---|---|
| 1,825,157 | Pardee | Sept. 29, 1931 |
| 2,620,069 | Wendt | Dec. 2, 1952 |